(No Model.)

A. FEHN.
STEAM COOKING APPARATUS.

No. 600,362. Patented Mar. 8, 1898.

Witnesses
Walter Snyder
Jonathan Tilley

Inventor
Adam Fehn
By Geo. H. Holgate
Attorney

THE NORRIS PETERS CO., PHOTO-LITHO., WASHINGTON, D. C.

UNITED STATES PATENT OFFICE.

ADAM FEHN, OF PHILADELPHIA, PENNSYLVANIA.

STEAM COOKING APPARATUS.

SPECIFICATION forming part of Letters Patent No. 600,362, dated March 8, 1898.

Application filed October 8, 1897. Serial No. 654,536. (No model.)

*To all whom it may concern:*

Be it known that I, ADAM FEHN, a citizen of the United States, residing at Philadelphia, in the county of Philadelphia and State of Pennsylvania, have invented a certain new and useful Improvement in Steam Cooking Apparatus, of which the following is a specification.

My invention relates to a new and useful improvement in steam cookers and roasters, and has for its object to provide a simple and effective apparatus of this description in which, by means of a gas or like burner, a variety of articles may be cooked at one and the same time without interfering with each other.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
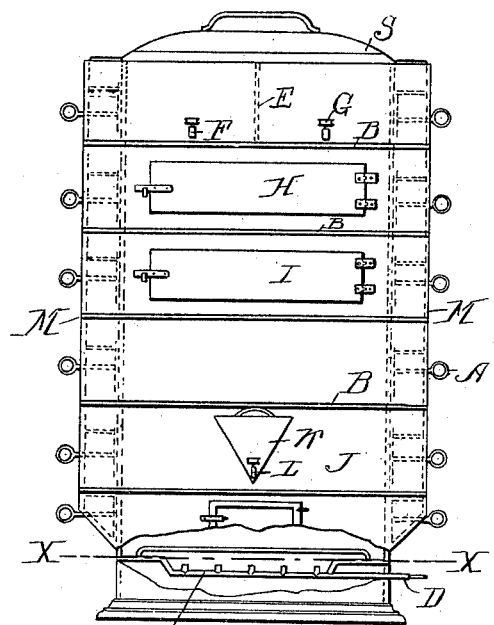
Figure 2:
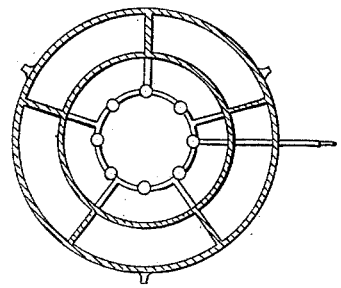
Figures 3, 4:
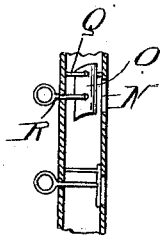
Figure 5:
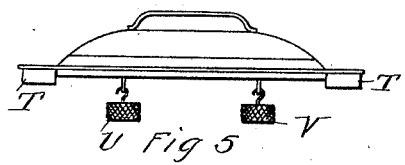

Figure 1 is an elevation of a cooker made in accordance with my improvement, the lower portion of the casing being broken away, so as to show the burner therein; Fig. 2, a section at the line $x\ x$; Fig. 3, a detail perspective of one of the dampers for the regulation of the currents of heated air; Fig. 4, a detail section of one of the hot-air flues, showing two of the dampers therein, one being open and the other closed; and Fig. 5, an elevation of the cover for the cooker.

In carrying out my invention as here embodied I provide a series of receptacles A, which are preferably of cylindrical shape, as shown in Fig. 2, and are so arranged that they may be placed one upon the other after the manner of a top upon a can, and thus form a complete apparatus. The lower receptacle has arranged therein a burner C, which is connected by the pipe D to the gas-supply, and suitable inlets may be provided for the feeding of air to this burner in order that the proper combustion may take place within the lower receptacle of the apparatus and thus generate heat for the cooking operations.

The upper receptacle of the cooker is subdivided by a partition E, so as to provide two compartments therein, one of which may be used for the making of coffee, while the other is used for making tea, and from these receptacles lead the faucets F and G, by means of which the liquid contents thereof may be withdrawn. Next below the upper compartment is a compartment to which access is gained by the door H, and in this last-named compartment meats may be roasted or other similar articles cooked, and again below this receptacle is another, to which access may be gained by the door I, and in like manner this receptacle may be used for various kinds of baking, roasting, or other cooking. The receptacle below the last named may be used for any kind of cooking, and access may be gained thereto either through the door I or a separate door formed therein, while yet beneath this receptacle is the boiler J, having a funnel-shaped extension K, through which water may be introduced to the boiler or withdrawn therefrom, and in practice I prefer that the faucet L lead from the lower portion of this extension, so as to facilitate the withdrawal of the water therefrom and also to determine when the water has reached its lowest safety-level.

Tubes M are secured to the sides of each of the receptacles and fit within each other when said receptacles are placed one upon the other, as shown, and communicate by suitable openings N with the burner-chamber and the several compartments thereabove. Each of these openings is provided with a damper O, fitted to slide upon the rod Q and put under control of the operator by the rod R, so that the flow of heated air from the burner-compartment or the steam from the boiler may be regulated to a nicety, thus regulating the cooking in the several receptacles to suit the particular requirements of the articles being cooked, and this is of especial advantage, since more or less moist heat may be imparted to the articles being cooked, or the steam moisture may be excluded entirely from any one of the compartments.

S represents the cover, which is adapted to fit upon the top of the apparatus, and this cover has also formed therewith the caps T, adapted to fit upon the upper ends of the tubes M, and in practice I provide holders U and V, which are suspended in any suitable manner from the under side of the cover and are adapted to hold tea, coffee, and the like, thereby suspending the same within the water, so as to properly extract the strength therefrom without permitting the grounds or leaves to become mixed with the liquid. By this arrangement when the cover is removed from the apparatus these holders are also drawn upward, unhooked, emptied, and cleaned.

By the use of my improvement great convenience is had in the cooking of various articles at one and the same time, and it has been found in practice that the various articles will be more perfectly cooked and under better control than by the usual methods, and, furthermore, my improvement is especially adapted for army, camp, or similar use, where cooking utensils must be packed in small space and used under trying circumstances.

It is to be noted that any number of the receptacles may be used to form a completed apparatus, thus adapting the device for the cooking of an indefinite number of articles at one and the same time.

Having thus fully described my invention, what I claim as new and useful is—

1. A cooking apparatus consisting of a casing divided into compartments, flues formed on the outside of the casing, a cover closing the casing, caps on the cover closing the flues, and holders suspended from the cover, as and for the purpose described.

2. A cooking apparatus consisting of a casing divided into compartments, flues formed on the outside of said casing, said flues having openings in the walls thereof communicating with the various compartments, rods extending between the walls of the flues, dampers slidable on said rods closing the openings, and operating-rods secured to the dampers and protruding to the outside of the flues, as and for the purpose described.

In testimony whereof I have hereunto affixed my signature in the presence of two subscribing witnesses.

ADAM FEHN.

Witnesses:
S. S. WILLIAMSON,
SAMUEL L. TAYLOR.